No. 858,230. PATENTED JUNE 25, 1907.
H. SYMONDS.
WALL REGISTER.
APPLICATION FILED MAY 19, 1906.
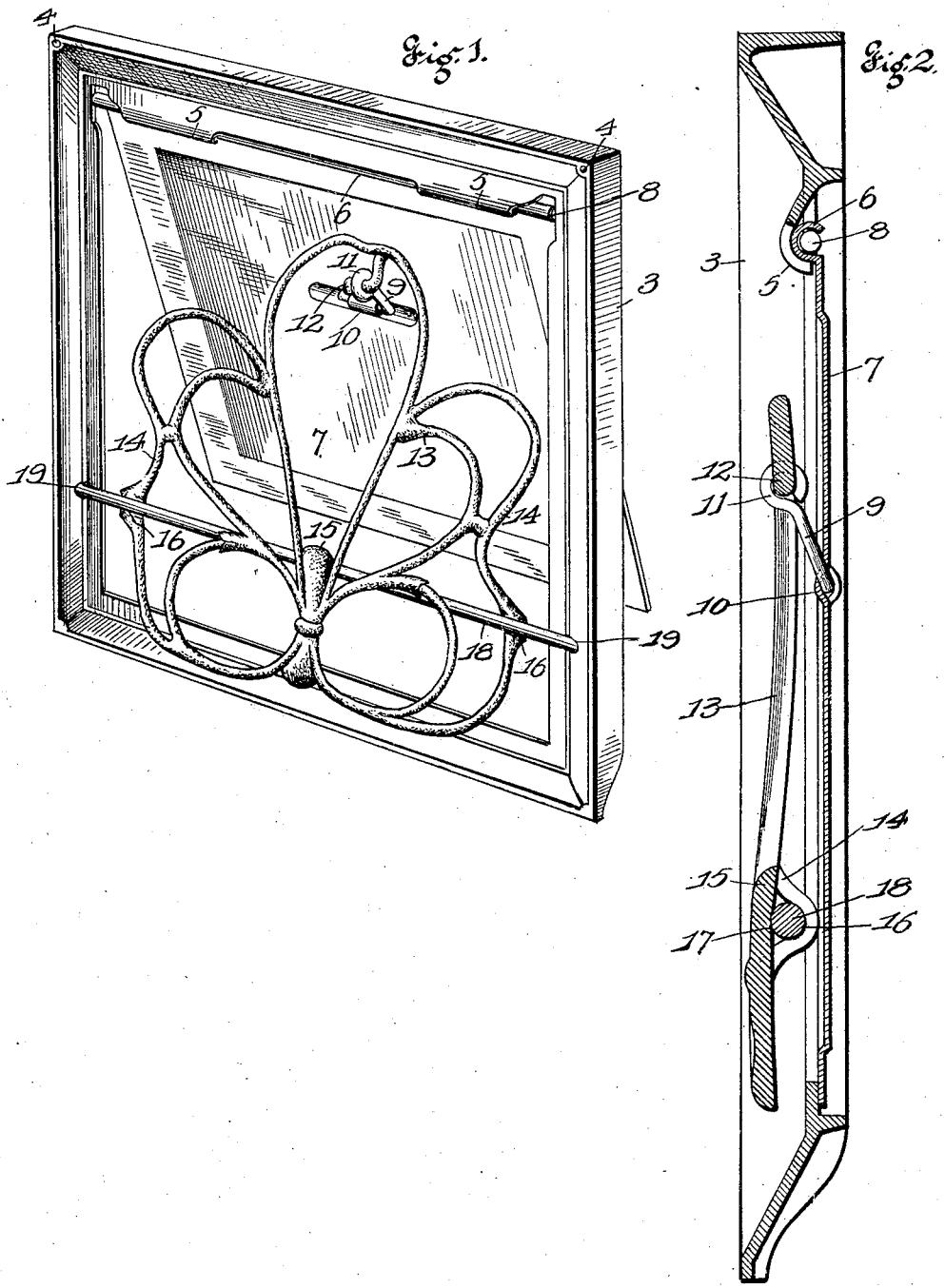

UNITED STATES PATENT OFFICE.

HERBERT SYMONDS, OF EAST ST. LOUIS, ILLINOIS.

WALL-REGISTER.

No. 858,230.  Specification of Letters Patent.  Patented June 25, 1907.

Application filed May 19, 1906. Serial No. 317,723.

*To all whom it may concern:*

Be it known that I, HERBERT SYMONDS, a citizen of the United States, and a resident of East St. Louis, Illinois, have invented certain new and useful Improvements in Wall-Registers, of which the following is a specification.

My invention relates to improvements in wall registers, and has for its object to provide a hot-air register for a wall, of the vertical type, wherein a single valve is actuated by a pivotally mounted grill, the grill serving to open and close the valve and to hold the same fixed in any desired position.

In the drawings—Figure 1 is a perspective view of a wall register embodying my invention. Fig. 2 is a transverse vertical view in mid-section of the same.

As illustrated in the drawings, I provide a frame 3 perforated at its corners as indicated by the numeral 4 so that it may be fixed in place upon a wall. At the upper inner edge of the frame downwardly and inwardly curved tongs 5 are provided. Within the inner faces of the curved tongs 5 the transverse corrugations 6 of the valve 7 is seated, and upon the vertical inner sides of the frame, at a point near the top of the frame, inwardly projecting lugs 8 are provided which engage with the ends of the corrugation 6 in the manner indicated in Fig. 2, so that the valve 7 is pivotally mounted upon the engagement of the corrugation 6 with the lugs 8 and tongs 5. The valve 7 is of a sufficient size to completely close the opening within the frame 3. At a point above its median line the valve 7 is provided with the single link 9 which is hinged to the valve 7 at the point indicated by the numeral 10. At its outer end, the link 9 is provided with the loop 11, which loop 11 engages with the projection 12 formed upon the grill 13. The grill 13 is preferably formed of a single casting as indicated in Fig. 1, having side-members 14 and a central body-member 15, the side members 14 being provided with depressions 16 upon their front faces, and the body-member 15 being provided with the corresponding depression 17 upon its rear face, the depressions 16, 16 and 17 being in alinement with each other. A transverse rod 18 is provided, which is rigidly mounted in the frame 3 at the points indicated by the numeral 19. The rod 18 is adapted to have frictional engagement with the grill 13, contacting with the depressions 16, 16 and 17 in the manner shown in the drawings, the grill 13 having sufficient resiliency to enable the side-member 14 to be sprung slightly backward to admit the rod 18, and when released, to exert such frictional pressure upon the rod 18 and the body-member 15 as to hold the grill 13 securely in place at any angle at which it is desired to be placed, to actuate the valve 7 through the link 9 and its connections.

The objects which I have attained by my invention are to simplify the construction of the register, reduce its cost, and to provide a complete register of so slight a thickness that a great number of the same may be packed for shipment within a small bulk. Furthermore, by having both the valve 7 and grill 13 held in position by reason of the frictional engagement between the grill 13 and the rod 18, I have provided durable and effective means, in that the resiliency of the entire width of a cast metallic grill is utilized to supply the necessary pressure upon the rod 18, and the result is a register capable of indefinite use, and more durable than those in which frictional engagement of the parts is provided by a limited area of frictional, contacting metal such as occurs when the grill is fixed, and the valve actuated by a sliding member contacting with an opening in the grill.

Having thus described my invention, what I claim as new, and desire to have secured to me by grant of Letters Patent, is:

1. In a wall register, the combination of a frame, a single valve pivotally and loosely mounted in the frame, a horizontal transverse rod rigidly mounted in the frame, a grill pivotally mounted upon said rod and having frictional engagement therewith, and a link connecting the valve with the grill, substantially as specified.

2. In a wall register, the combination of a frame, a single valve pivotally mounted at the upper inner edge of the frame, a rod horizontally and rigidly mounted across the frame, a grill having a body portion whose rear face contacts with said rod, and side-members whose front faces contact with said rod, and a link connecting the valve to the grill so that the valve is held in open, closed or intermediate positions by the frictional engagement of the grill with the rod, substantially as specified.

3. In a wall register, the combination of a frame, a single valve pivotally mounted at the upper inner edge of the frame, a rod horizontally and rigidly mounted in the frame, a grill pivotally mounted within the frame upon said rod, and a link connecting the valve to the grill so that the valve is held in open, closed or intermediate positions by the frictional engagement of the grill with the rod, substantially as specified.

In testimony whereof, I have signed my name to this specification, in presence of two subscribing witnesses.

HERBERT SYMONDS.

Witnesses:
ALFRED A. EICKS,
WALTER C. STEIN.